(12) United States Patent
Asahi

(10) Patent No.: US 11,962,018 B2
(45) Date of Patent: Apr. 16, 2024

(54) ELECTROCHEMICAL OXYGEN REDUCTION CATALYST

(71) Applicant: National Institute of Advanced Industrial Science and Technology, Tokyo (JP)

(72) Inventor: Masafumi Asahi, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 613 days.

(21) Appl. No.: 17/054,413

(22) PCT Filed: May 15, 2019

(86) PCT No.: PCT/JP2019/019229
§ 371 (c)(1),
(2) Date: Nov. 10, 2020

(87) PCT Pub. No.: WO2019/221156
PCT Pub. Date: Nov. 21, 2019

(65) Prior Publication Data
US 2021/0384524 A1    Dec. 9, 2021

(30) Foreign Application Priority Data
May 15, 2018    (JP) .................. 2018-094138

(51) Int. Cl.
*H01M 4/92* (2006.01)
*C08G 73/06* (2006.01)
(Continued)

(52) U.S. Cl.
CPC ........ *H01M 4/926* (2013.01); *C08G 73/0644* (2013.01); *H01M 4/8652* (2013.01);
(Continued)

(58) Field of Classification Search
CPC .... B01J 23/56; B01J 31/0244; B01J 35/0033; H01M 4/926; H01M 4/8652;
(Continued)

(56) References Cited

U.S. PATENT DOCUMENTS 7,214,762 B1     5/2007 Mitani et al.
9,780,385 B2 *  10/2017 Ichioka ............... H01M 8/1007
(Continued)

FOREIGN PATENT DOCUMENTS

CN    1618137 A    5/2005
CN    103221128 A  7/2013
(Continued)

OTHER PUBLICATIONS

English translation of the Written Opinion for PCT/JP2019/019229. (dated Year: 2019).*
(Continued)

*Primary Examiner* — Patricia L. Hailey
(74) *Attorney, Agent, or Firm* — Cesari and McKenna, LLP

(57) ABSTRACT

An electrochemical oxygen reduction catalyst comprising platinum-containing nanoparticles and at least one member selected from the group consisting of a melamine compound, a thiocyanuric acid compound, and a polymer containing the melamine compound or the thiocyanuric acid compound as a monomer is an electrochemical oxygen reduction catalyst having a high oxygen reduction activity (small overvoltage).

9 Claims, 6 Drawing Sheets

(51) Int. Cl.
*H01M 4/86* (2006.01)
*H01M 12/08* (2006.01)

(52) U.S. Cl.
CPC ......... *H01M 4/8663* (2013.01); *H01M 12/08* (2013.01); *H01M 2004/8689* (2013.01)

(58) Field of Classification Search
CPC ............... H01M 4/8663; H01M 12/08; H01M 2004/8689; C08G 73/0644
USPC ........................................................ 502/185
See application file for complete search history.

(56) References Cited

U.S. PATENT DOCUMENTS

| 2003/0176277 | A1* | 9/2003 | Suh ....................... H01M 4/921 |
| | | | 502/185 |
| 2005/0008934 | A1 | 1/2005 | Oyama et al. |
| 2013/0260286 | A1 | 10/2013 | Akasaka et al. |
| 2013/0280419 | A1 | 10/2013 | Calabrese Barton et al. |
| 2014/0228602 | A1 | 8/2014 | Bishop et al. |
| 2016/0304418 | A1 | 10/2016 | Bishop et al. |
| 2023/0178757 | A1* | 6/2023 | Zou ..................... H01M 4/9041 |
| | | | 502/185 |

FOREIGN PATENT DOCUMENTS

| CN | 105312087 | A | 2/2016 | |
| CN | 106784888 | A | 5/2017 | |
| JP | 2007/175578 | A | 7/2007 | |
| JP | 2011/092940 | A | 5/2011 | |
| JP | 4877732 | B2 * | 2/2012 | ............. B01J 27/24 |
| JP | 2013/208597 | A | 10/2013 | |
| WO | WO-2020065005 | A1 * | 4/2020 | ............. C23C 18/12 |

OTHER PUBLICATIONS

Office Action dated Nov. 23, 2021 for the corresponding Chinese Patent Application No. 201980031473.9.

* cited by examiner

ELECTROCHEMICAL OXYGEN REDUCTION CATALYST

CROSS REFERENCE TO RELATED APPLICATIONS

This application is the National Stage of International Application No. PCT/JP2019/019229, filed on May 15, 2019, which claims priority to Japanese Application No. 2018-094,138, filed on May 15, 2018, the contents of both prior applications being hereby incorporated by reference in their entirety.

TECHNICAL FIELD

The present invention relates to an electrochemical oxygen reduction catalyst.

BACKGROUND ART

The spread of polymer electrolyte fuel cells (PEFCs) in the near future is expected due to their compact size and high efficiency, as well as from the viewpoint of global environmental issues.

Polymer electrolytes used in PEFCs are generally highly acidic cation exchange membranes; therefore, an electrode catalyst must act stably under highly acidic conditions. For this reason, platinum or a platinum-containing alloy is currently the only electrode catalyst that is viable for practical use.

An electrode reaction that occurs in the air electrode (cathode) of a PEFC is an oxygen reduction reaction. Even when platinum is used as the electrode catalyst, the overvoltage in the electrochemical oxygen reduction reaction, which is the air electrode reaction during discharge, is high; and the loss at the air electrode is a major factor in power reduction.

As a method of reducing such a high overvoltage, a method of alloying platinum and a method of using platinum-containing core-shell nanoparticles are known (see, for example, Patent Literature 1). However, even with such methods, the activity is still not sufficient, and an increase in the platinum amount is required; accordingly, there is a demand for another method to reduce the overvoltage.

Metal-air batteries are batteries that use zinc, iron, aluminum, or like metals for the anode, and an air electrode for the cathode. These batteries can utilize oxygen in the air as the active material on the cathode side; and their electrical capacity is determined only by their anode capacity, thus achieving high energy density. In a metal-air battery, the reaction on the air electrode (cathode) side is known to be an oxygen reduction reaction during discharge, and an oxygen generation reaction during charge. Accordingly, an air electrode using oxygen as an active material is also used in a metal-air battery, as in a PEFC or the like; thus, the development of a catalyst that is highly active for an oxygen reduction reaction is desired.

CITATION LIST

Patent Literature

PTL 1: JP2011-092940A

SUMMARY OF INVENTION

Technical Problem

The present invention was made in view of the above problems, and an object of the present invention is to provide an electrochemical oxygen reduction catalyst having high oxygen reduction activity (low overvoltage).

Solution to Problem

The present inventors conducted extensive research in light of the above problem. As a result, they found that the above problem can be solved when platinum-containing nanoparticles and at least one member selected from the group consisting of a melamine compound, a thiocyanuric acid compound, and a polymer containing a melamine compound or a thiocyanuric acid compound as a monomer are contained. The present invention was accomplished by further research based on the above finding. Specifically, the present invention includes the following.

Item 1. An electrochemical oxygen reduction catalyst comprising platinum-containing nanoparticles and at least one member selected from the group consisting of a melamine compound, a thiocyanuric acid compound, and a polymer containing the melamine compound or the thiocyanuric acid compound as a monomer.

Item 2. The electrochemical oxygen reduction catalyst according to Item 1, wherein the at least one member selected from the group consisting of a melamine compound, a thiocyanuric acid compound, and a polymer containing the melamine compound or the thiocyanuric acid compound as a monomer is supported on the platinum-containing nanoparticles.

Item 3. The electrochemical oxygen reduction catalyst according to Item 1 or 2, wherein the melamine compound and the thiocyanuric acid compound are represented by formula (1):

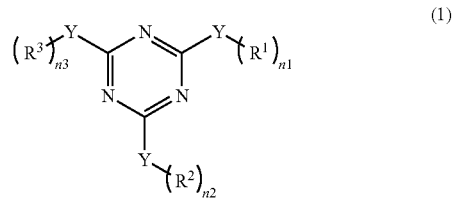

wherein

Ys may be the same or different, and represent nitrogen or sulfur;

$R^1$ to $R^3$ may be the same or different, and represent hydrogen, hydroxy, a halogen atom, substituted or unsubstituted alkyl, substituted or unsubstituted alkenyl, or substituted or unsubstituted aryl;

n1 is 1 or 2 wherein when Y to which $R^1$ is bonded is nitrogen, n1 is 2; when Y to which R is bonded is sulfur, n1 is 1; and when n1 is 2, two $R^1$s may be the same or different;

n2 is 1 or 2 wherein when Y to which $R^2$ is bonded is nitrogen, n2 is 2; when Y to which $R^2$ is bonded is sulfur, n2 is 1; and when n2 is 2, two $R^2$s may be the same or different;

n3 is 1 or 2 wherein when Y to which $R^3$ is bonded is nitrogen, n3 is 2; when Y to which $R^3$ is bonded is sulfur, n3 is 1; and when n3 is 2, two $R^3$s may be the same or different; and n1, n2, and n3 may be the same or different.

Item 4. The electrochemical oxygen reduction catalyst according to any one of Items 1 to 3, wherein the polymer containing the melamine compound or the thiocyanuric acid compound as a monomer is a polymer containing a repeating unit represented by formula (2):

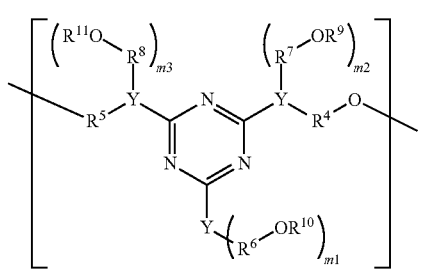

(2)

wherein
Ys may be the same or different, and represent nitrogen or sulfur;
$R^4$ to $R^8$ may be the same or different, and represent a divalent group;
$R^9$ to $R^1$ may be the same or different, and represent hydrogen, substituted or unsubstituted alkyl, substituted or unsubstituted alkenyl, or substituted or unsubstituted aryl;
m1 is 1 or 2 wherein when Y to which $R^6$ is bonded is nitrogen, m1 is 2; when Y to which $R^6$ is bonded is sulfur, m1 is 1; and when m1 is 2, two $R^6$s may be the same or different and two $R^{10}$s may be the same or different;
m2 and m3 may be the same or different, and represent 0 or 1, wherein when Y to which $R^7$ or $R^8$ is bonded is nitrogen, m2 and m3 are 1; when Y to which $R^7$ or $R^8$ is bonded is sulfur, m2 and m3 are 0; and
$OR^9$ to $OR^{11}$ may be partially or fully eliminated, and cross-linked to the divalent group represented by $R^4$ to $R^8$ to form a three-dimensional mesh structure.

Item 5. The electrochemical oxygen reduction catalyst according to Item 4, wherein in formula (2), each of $R^4$ to $R^8$ is substituted or unsubstituted alkylene, substituted or unsubstituted alkenylene, or substituted or unsubstituted arylene.

Item 6. The electrochemical oxygen reduction catalyst according to any one of Items 1 to 5, which is supported on a conductive carrier.

Item 7. The electrochemical oxygen reduction catalyst according to Item 6, wherein the conductive carrier is a carbonaceous material.

Item 8. The electrochemical oxygen reduction catalyst according to any one of Items 1 to 7, which is a cathode catalyst for fuel cells.

Item 9. An air electrode for fuel cells or metal-air batteries, using the electrochemical oxygen reduction catalyst according to any one of Items 1 to 8.

Item 10. A fuel cell using the air electrode according to Item 9 as a cathode.

Item 11. A metal-air battery using the air electrode according to Item 9 as a cathode.

Advantageous Effects of Invention

According to the present invention, an electrochemical oxygen reduction catalyst having high oxygen reduction activity (low overvoltage) can be provided. In particular, the use of a polymer containing a melamine compound or a thiocyanuric acid compound as a monomer can suppress reduction in the effect of improving the oxygen reduction activity due to repeated potential cycling.

DESCRIPTION OF EMBODIMENTS

Figure 1:
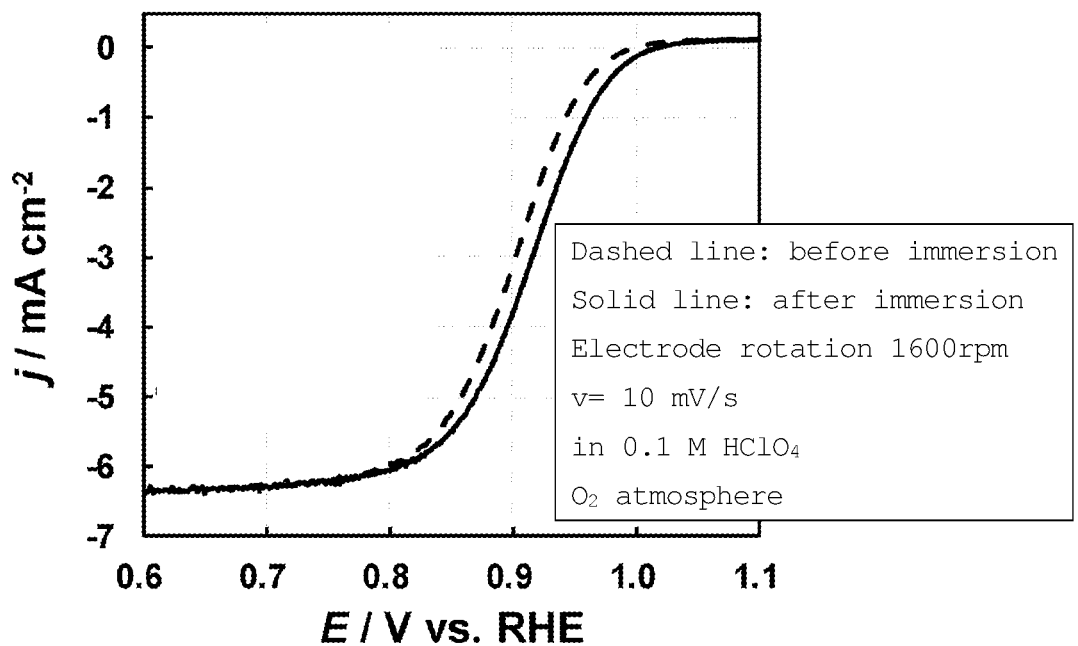
FIG. 1 is a linear sweep voltammogram showing the results of Example 1 (effects of increase in oxygen reduction activity by melamine adsorption).

In the present specification, "contain" and "comprise" include all the concepts of "comprise," "consist essentially of," and "consist of." In the present specification, the numerical range defined by A to B indicates A or more to B or less.

1. Electrochemical Oxygen Reduction Catalyst

The electrochemical oxygen reduction catalyst of the present invention is a catalyst used for electrochemically reducing oxygen; and contains platinum-containing nanoparticles, and at least one member selected from the group consisting of a melamine compound, a thiocyanuric acid compound, and a polymer containing the melamine compound or the thiocyanuric acid compound as a monomer. More specifically, from the viewpoint of oxygen reduction activity, it is preferable that at least one member selected from the group consisting of a melamine compound, a thiocyanuric acid compound, and a polymer containing the melamine compound or the thiocyanuric acid compound as a monomer is supported on the platinum-containing nanoparticles. The electrochemical oxygen reduction catalyst of the present invention may include the melamine compound, the thiocyanuric acid compound, and the polymer containing the melamine compound or the thiocyanuric acid compound as a monomer, singly or in a combination of two or more.

(1-1) Platinum-Containing Nanoparticles

As platinum-containing nanoparticles, a catalyst conventionally used for an air electrode for fuel cells can be used. Examples include platinum nanoparticles, platinum alloy nanoparticles, platinum-containing core-shell type nanoparticles, and the like.

When platinum alloy nanoparticles are used, an alloy of platinum and at least one of iron, nickel, manganese, copper, cobalt, chromium, titanium, ruthenium, rhodium, palladium, silver, iridium, and gold is preferable. In this case, the content of platinum in a platinum alloy is preferably 50 to 95 mass %, from the viewpoint of further reducing the overvoltage.

When the platinum-containing core-shell type nanoparticles is used, it is preferable that the core portion is formed of an alloy containing a metal that is less expensive than platinum, and that the shell portion is formed of platinum, from the viewpoint of further reducing the overvoltage and the amount of platinum used. Examples of the platinum alloy in the core portion include those described above.

The average particle size of the above-described platinum-containing nanoparticles is not specifically limited. The use of nanoparticles having a small average particle size will increase the active surface area; however, platinum particles that are overly small cannot stably exist. From this point of view, the average particle size of platinum-containing nanoparticles is preferably 2 nm to 40 nm, more preferably 2.4 nm to 30 nm, and even more preferably 3 nm to 20 nm. When platinum-containing core-shell type nanoparticles are used, the average thickness of the shell portion is preferably 1 to 3 atomic layers.

(1-2) Melamine Compound, Thiocyanuric Acid Compound, and Polymer Using Melamine Compound or Thiocyanuric Acid Compound as Monomer As the melamine compound and thiocyanuric acid compound, in addition to melamine and thiocyanuric acid, derivatives of melamine and thiocyanuric acid can be used without limitation. Examples include melamine compounds and thiocyanuric acid compounds represented by formula (1):

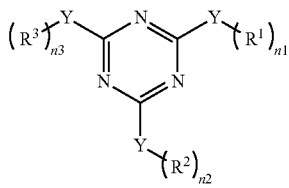

wherein Ys may be the same or different, and represent nitrogen or sulfur; $R^1$ to $R^3$ may be the same or different, and represent hydrogen, hydroxy, a halogen atom, substituted or unsubstituted alkyl, substituted or unsubstituted alkenyl, or substituted or unsubstituted aryl; n1 is 1 or 2 with the proviso that when Y to which $R^1$ is bonded is sulfur, n1 is 1; and when n1 is 2, two $R^1$s may be the same or different; n2 is 1 or 2 with the proviso that Y to which $R^2$ is bonded is sulfur, n2 is 1; and when n2 is 2, two $R^2$s may be the same or different; n3 is 1 or 2 with the proviso that when Y to which $R^3$ is bonded is sulfur, n3 is 1; and when n3 is 2, two $R^3$s may be the same or different; and n1, n2, and n3 may be the same or different.

Specifically, any of the melamine compounds represented by formula (1A1):

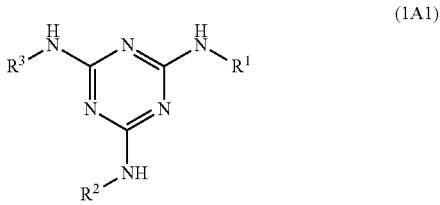

wherein $R^1$ to R are as defined above,
melamine compounds represented by formula (1A2):

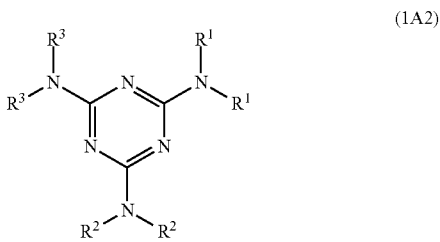

wherein $R^1$ to R are as defined above, and
thiocyanuric acid compounds represented by formula (1B):

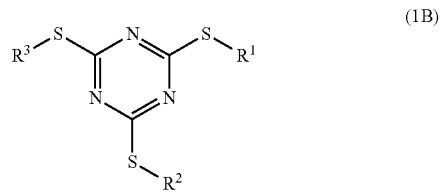

wherein $R^1$ to $R^3$ are as defined above can be used.

In formula (1), either nitrogen or sulfur can be used as Y Nitrogen is preferable from the viewpoint of performing an oxygen reduction reaction at a higher potential to further improve oxygen reduction activity (to further reduce overvoltage), thereby further reducing the amount of platinum used. Similarly, all of n1, n2, and n3 are preferably 2. n1, n2, and n3 may be the same or different.

In formula (1), examples of halogen atom represented by $R^1$ to $R^3$ include fluorine, chlorine, bromine, iodine, and the like.

In formula (1), examples of alkyl represented by $R^1$ to R include lower alkyl, such as methyl, ethyl, n-propyl, isopropyl, n-butyl, isobutyl, sec-butyl, tert-butyl, n-pentyl, and n-hexyl (particularly, straight or branched alkyl having 1 to 10 carbon atoms, and more particularly 1 to 6 carbon atoms). The alkyl may have 1 to 6 (particularly 1 to 3) substituents, such as hydroxy, the halogen atom(s), and amino.

In formula (1), examples of alkenyl represented by $R^1$ to $R^3$ include lower alkenyl, such as vinyl, allyl, 2-butenyl, 3-butenyl, 1-methylallyl, 2-pentenyl, and 2-hexenyl (particularly, straight or branched alkenyl having 2 to 10 carbon atoms, and more particularly 2 to 6 carbon atoms). The alkenyl may have 1 to 6 (particularly 1 to 3) substituents, such as hydroxy, the halogen atom(s), and amino.

In formula (1), examples of aryl represented by $R^1$ to $R^3$ include aryl, such as phenyl, naphthyl, and anthracenyl (particularly aryl having 6 to 20 carbon atoms, more particularly 6 to 18 carbon atoms). The aryl may have 1 to 6 (particularly 1 to 3) substituents, such as hydroxy, the halogen atom(s), and amino.

In formula (1), $R^1$ to $R^3$ are preferably hydrogen, substituted or unsubstituted alkyl, substituted or unsubstituted alkenyl, or substituted or unsubstituted aryl from the viewpoint of performing an oxygen reduction reaction at a higher potential to improve oxygen reduction activity (to reduce overvoltage), thereby reducing the amount of platinum used. $R^1$ to $R^3$ may be the same or different. When n1 is 2, two $R^1$s may be the same or different; when n2 is 2, two $R^2$s may be the same or different; and when n3 is 2, two $R^3$s may be the same or different.

Examples of melamine compounds and thiocyanuric acid compounds satisfying the above conditions include

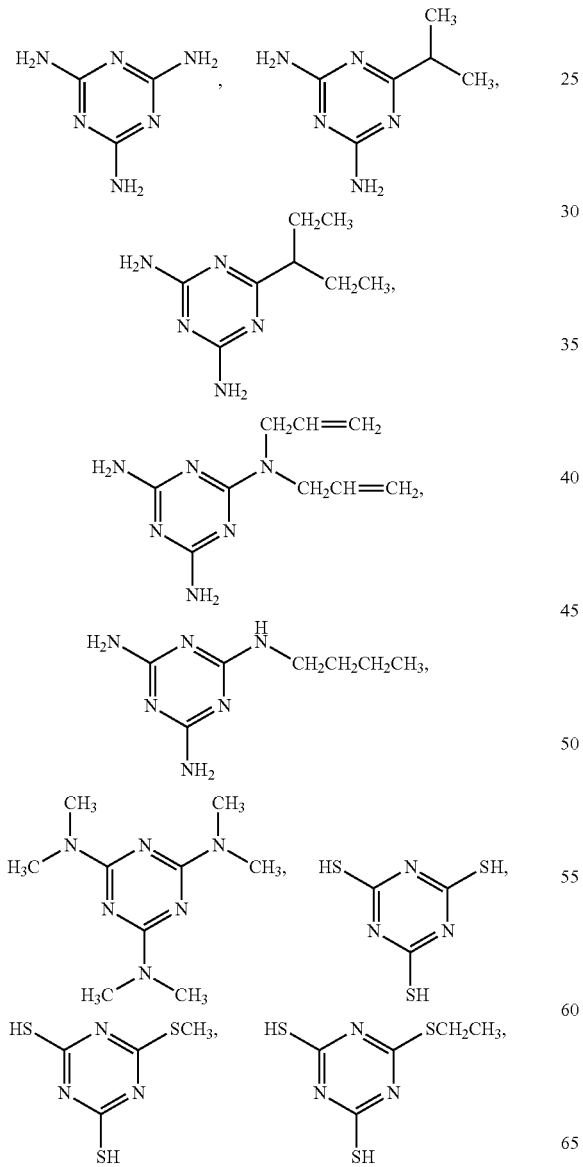

-continued

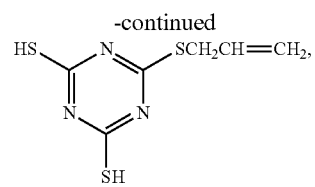

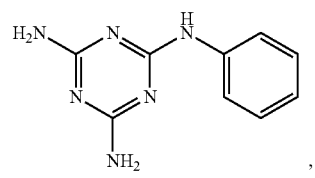

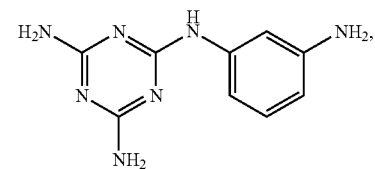

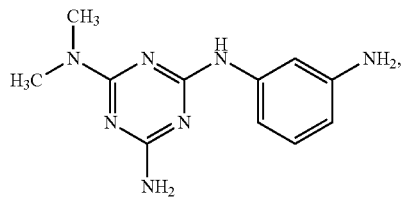

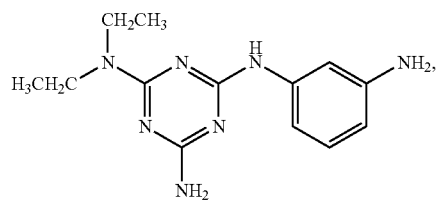

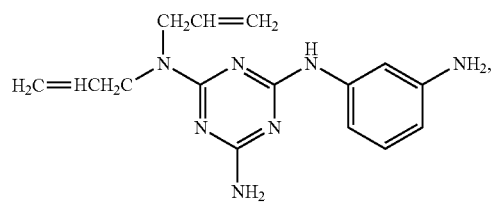

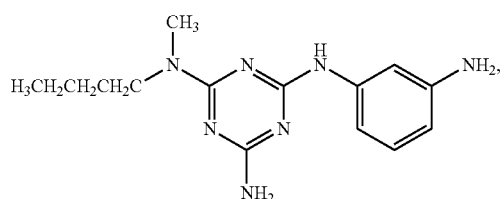

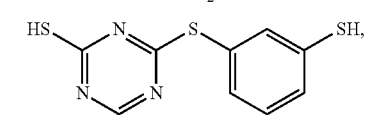

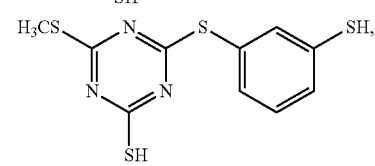

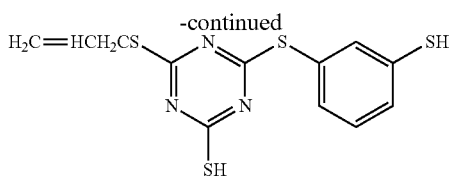

Such melamine compounds and thiocyanuric acid compounds may be commercially available products, or may be synthesized separately.

Usable examples of the polymer containing a melamine compound or a thiocyanuric acid compound as a monomer include melamine resins having the aforementioned melamine compound in the main chain of the repeating unit, and polymers having the above-mentioned thiocyanuric acid compound in the main chain of the repeating unit Usable examples include melamine resins or polymers of thiocyanuric acid compounds having a repeating unit represented by formula (2):

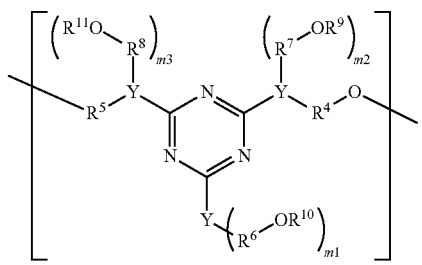

(2)

wherein Ys may be the same or different, and represent nitrogen or sulfur; $R^4$ to $R^8$ may be the same or different, and represent a divalent group; $R^9$ to $R^{11}$ may be the same or different, and represent hydrogen, substituted or unsubstituted alkyl, substituted or unsubstituted alkenyl, or substituted or unsubstituted aryl; m1 is 1 or 2 with the proviso that when Y to which $R^6$ is bonded is sulfur, m1 is 1; and when m1 is 2, two $R^6$s may be the same or different and two $R^{10}$s may be the same or different; m2 and m3 may be the same or different, and represent 0 or 1, with the proviso that when Y to which $R^7$ or $R^8$ is bonded is sulfur, m2 and m3 are 0; and $OR^9$ to $OR^{11}$ may be partially or fully eliminated, and cross-linked to the divalent group represented by $R^4$ to $R^8$ to form a three-dimensional mesh structure.

Specifically, any of the melamine compounds represented by formula (2A1):

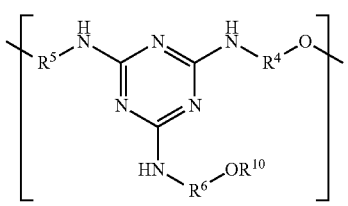

(2A1)

wherein $R^4$ to $R^6$ and R are as defined above,
melamine compounds represented by formula (2A2):

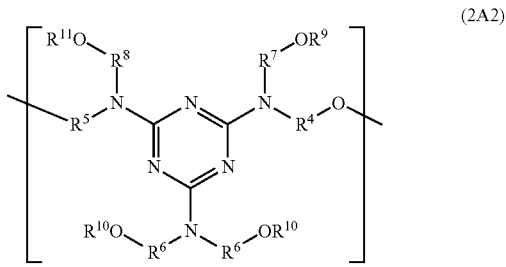

(2A2)

wherein $R^4$ to $R^{11}$ are as defined above, and
thiocyanuric acid compounds represented by formula (2B):

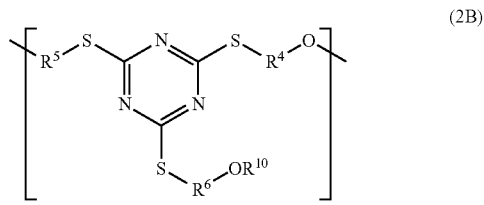

(2B)

wherein $R^4$ to $R^6$ and $R^{10}$ are as defined above can be used.

In formula (2), either nitrogen or sulfur can be used as Y Nitrogen is preferable from the viewpoint of performing an oxygen reduction reaction at a higher potential to improve oxygen reduction activity (to reduce overvoltage), thereby reducing the amount of platinum used. Similarly, m1 is preferably 2, and m2 and m3 are preferably 1. m2 and m3 may be the same or different.

Examples of the divalent group represented by $R^4$ to $R^8$ include alkylene, alkenylene, arylene, and the like.

Examples of alkylene include lower alkylene, such as methylene, ethylene, trimethylene, and propylene (particularly linear or branched alkylene having 1 to 10 carbon atoms, and more particularly 1 to 6 carbon atoms). The alkylene may have 1 to 6 (particularly 1 to 3) substituents, such as hydroxy, the halogen atom(s), and amino.

Examples of alkenylene include lower alkenylene, such as vinylene, allylene, and butenylene (particularly alkenylene having 2 to 10 carbon atoms, and more particularly 2 to 6 carbon atoms). Further, the alkenylene may have 1 to 6 (particularly 1 to 3) substituents, such as hydroxy, the halogen atom(s), and amino.

Examples of the arylene include arylene, such as phenylene, naphthylene, and anthracenylene (particularly arylene having 6 to 20 carbon atoms, and more particularly 6 to 18 carbon atoms.) The arylene may have 1 to 6 (particularly 1 to 3) substituents, such as hydroxy, the halogen atom(s), and amino.

In formula (2), $R^4$ to $R^8$ are preferably substituted or unsubstituted alkylene, or substituted or unsubstituted arylene, from the viewpoint of performing an oxygen reduction reaction at a higher potential to further improve oxygen reduction activity (to further reduce overvoltage), thereby further reducing the amount of platinum used. $R^4$ to $R^8$ may be the same or different. When m1 is 2, two $R^6$s may be the same or different, and two $R^{10}$s may be the same or different.

In formula (2), as alkyl, alkenyl, and aryl represented by $R^9$ to $R^{11}$, those described above can be used. The same applies to the type and the number of substituents.

Examples of a repeating unit satisfying the above conditions include

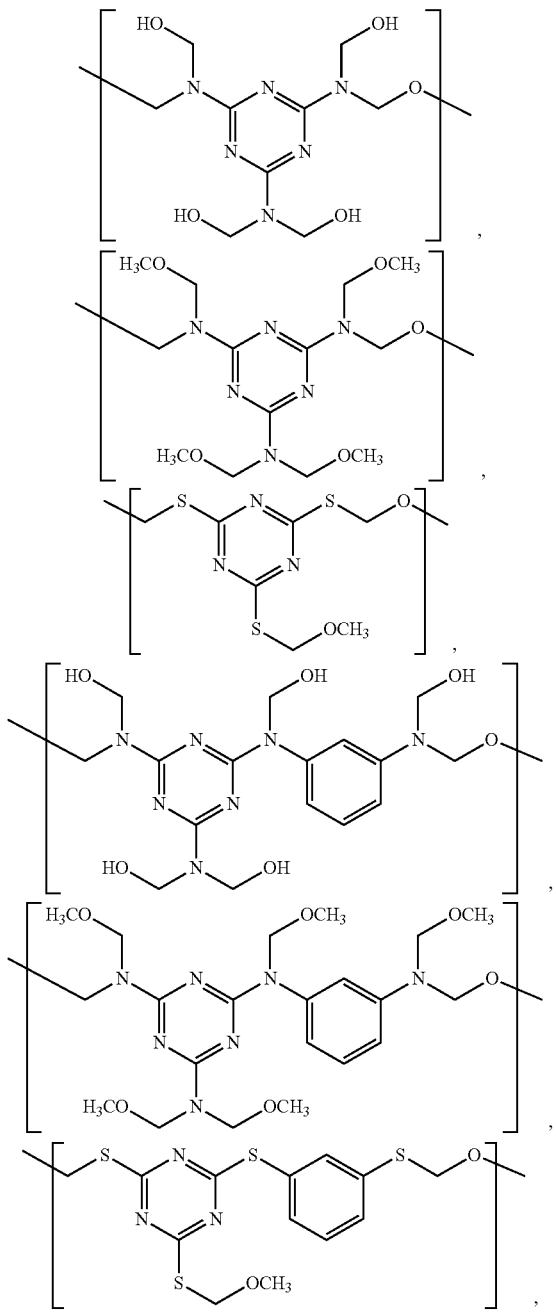

and the like.

The polymer containing a melamine compound or a thiocyanuric acid compound as a monomer may be, as a polymer formed only of a repeating unit represented by formula (2), a melamine resin or a polymer of a thiocyanuric acid compound represented by formula (3), wherein Y, $R^4$ to $R^1$, and m1 to m3 are as defined above, and k is an integer of 2 to 1000.

Further, the polymer containing a melamine compound or a thiocyanuric acid compound as a monomer can also include repeating units other than the repeating unit represented by formula (2) (for example, $OR^9$ to $OR^{11}$ are partially or fully removed, and cross-linked to the divalent group represented by $R^4$ to R to form a three-dimensional mesh structure). In this case, the proportion of each repeating unit is preferably within a range that does not impair the effects of the present invention (for example, the repeating unit represented by formula (2) is 50 to 99 mol % when the total of the repeating unit represented by formula (2) and other repeating unit(s) is 100 mol %).

The polymerization degree of the polymer containing a melamine compound or a thiocyanuric acid compound as a monomer (corresponding to k in the case of a melamine resin or a polymer of thiocyanuric acid compound represented by formula (3)) is not particularly limited; however, the average (typical) polymerization degree is preferably 2 to 1000, and more preferably 3 to 500 from the viewpoint of performing an oxygen reduction reaction at a higher potential to further improve oxygen reduction activity (further reduce overvoltage) and maintain the oxygen reduction activity even after repeated potential cycling, thereby further improving the durability.

The terminal group of the polymer containing a melamine compound or a thiocyanuric acid compound as a monomer is not particularly limited. Examples include hydrogen, hydroxy, the above alkyl, the above alkenyl, the above aryl, and the like.

The amount of the melamine compound, the thiocyanuric acid compound, or the polymer containing a melamine compound or a thiocyanuric acid compound as a monomer is not particularly limited. For example, it is preferable to contain (particularly support) the melamine compound, thiocyanuric acid compound, or polymer containing a melamine compound or a thiocyanuric acid compound as a monomer in an amount of 0.1 to 50 parts by mass, and particularly preferably 1 to 30 parts by mass, relative to 100 parts by mass of the platinum-containing nanoparticles. In addition, it is preferable that 10 to 70%, and particularly 20 to 50% of the electrochemical active surface area (ECSA) of platinum-containing nanoparticles, which is evaluated from the electricity amount resulting from hydrogen desorption from the platinum surface is covered with the melamine compound, thiocyanuric acid compound, or polymer containing a melamine compound or a thiocyanuric acid compound as a monomer. When the melamine compound, the thiocyanuric acid compound, and the polymer containing a melamine compound or a thiocyanuric acid compound as a monomer are used in combination, the total amount thereof is preferably adjusted to be within the range mentioned above.

(1-3) Conductive Carrier

Supporting the platinum nanoparticles on a conductive carrier further improves the conductivity, and reduces the platinum amount used. The conductive carrier is not particularly limited, as long as it is conventionally used as a conductive carrier of a catalyst for electrochemically reducing oxygen. Examples include carbonaceous materials such as carbon black (Ketjen black, furnace black, acetylene black, etc.), activated carbon, graphite, and glassy carbon; and conductive oxides such as tin and titanium. Of these, carbon black is preferable from the viewpoint of conductivity and surface area.

The shape of the conductive carrier is not particularly limited, and preferably follows the shape of the air electrode.

(1-4) Electrochemical Oxygen Reduction Catalyst

The shape of the electrochemical oxygen reduction catalyst of the present invention is not particularly limited, and preferably follows the shape of the air electrode.

Since the electrochemical oxygen reduction catalyst of the present invention has an oxygen reduction activity of reducing oxygen to water, it can be suitably used as a catalyst for electrodes of a cell using oxygen as an active material. Specifically, the electrochemical oxygen reduction catalyst of the present invention can be preferably used as an air electrode catalyst for fuel cells (particularly polymer electrolyte fuel cells, phosphoric acid fuel cells, etc.) or for metal-air batteries.

2. Method for Producing Electrochemical Oxygen Reduction Catalyst

The method for producing the electrochemical oxygen reduction catalyst of the present invention is not particularly limited. For example, by a method such as a solution-drying method or a gas phase method, at least one member selected from the group consisting of a melamine compound, a thiocyanuric acid compound, and a polymer containing a melamine compound or a thiocyanuric acid compound as a monomer can be supported on the platinum-containing nanoparticles.

For example, in the solution-drying method, platinum-containing nanoparticles (particularly platinum catalyst) and at least one member selected from the group consisting of a melamine compound, a thiocyanuric acid compound, and a polymer containing a melamine compound or a thiocyanuric acid compound as a monomer are dissolved or dispersed (suspended) beforehand in a solvent, followed by stirring, as necessary; thereby, at least one member selected from the group consisting of a melamine compound, a thiocyanuric acid compound, and a polymer containing a melamine compound or a thiocyanuric acid compound as a monomer is adsorbed on the platinum-containing nanoparticles (particularly platinum catalyst). Thereafter, by filtering the resulting suspension to collect powders, the catalyst of the present invention can be obtained. The platinum-containing nanoparticles can be supported on a conductive carrier by an ordinary method. By a similar method as above, a melamine compound, a thiocyanuric acid compound, and a polymer containing a melamine compound or a thiocyanuric acid compound as a monomer can also be supported on a catalyst in which the platinum nanoparticles are supported on the conductive carrier.

Any solvent can be used without particular limitation as long as the platinum-containing nanoparticles and the melamine compound, the thiocyanuric acid compound, and the polymer containing a melamine compound or a thiocyanuric acid compound as a monomer can be dissolved or dispersed (suspended) in the solvent. For example, organic solvents, such as acetone, toluene, methanol, ethanol, 1-propanol, 2-propanol, dichloromethane, tetrahydrofuran, acetonitrile, and dimethylformamide; and water, can be suitably used. These organic solvents and water can be used singly, or in a combination of two or more.

The concentrations of the platinum-containing nanoparticles (particularly platinum catalyst) and at least one member selected from the group consisting of a melamine compound, a thiocyanuric acid compound, and a polymer containing a melamine compound or a thiocyanuric acid compound as a monomer are not particularly limited, and can be adjusted to the use amounts described above. For example, as a charged amount, the concentration of the platinum-containing nanoparticles (particularly platinum catalyst) is preferably 0.1 to 10.0 g/L, and more preferably 0.5 to 5.0 g/L. As a charged amount, the concentration of the melamine compound, thiocyanuric acid compound, or polymer containing a melamine compound or a thiocyanuric acid compound as a monomer is preferably 0.05 to 3.0 g/L, and more preferably 0.15 to 1.5 g/L.

3. Air Electrode and Cell

The air electrode of the present invention is an air electrode for fuel cells (particularly polymer electrolyte fuel cells, phosphoric acid fuel cells, etc.) or for metal-air batteries using the electrochemical oxygen reduction catalyst of the present invention described above.

Such an air electrode can be similar to conventional air electrodes, except that the electrochemical oxygen reduction catalyst of the present invention is used as a catalyst. For example, the air electrode of the present invention can have an air electrode catalyst layer.

The thickness of the air electrode catalyst layer is not particularly limited, and is generally about 0.1 to 100 μm. The amount of the catalyst is also not particularly limited; and is, for example, about 0.01 to 20 mg/cm$^2$.

The method for forming the air electrode catalyst layer is not particularly limited. The air electrode catalyst layer can be produced by a method in which a catalyst ink prepared by mixing the electrochemical oxygen reduction catalyst of the present invention and a resin solution is applied to a gas diffusion layer or a current collector, and dried.

The other structure of the air electrode can be the same as those of known air electrodes. For example, the air electrode may have a structure in which a current collector such as carbon paper, carbon cloth, a metal mesh, a metal sintered body, a foam metal plate, or a metal porous body is disposed on the catalyst layer side of the air electrode; and a water-repellent film, a diffusion film, an air distribution layer, etc., are provided.

As the electrolyte, the electrochemical oxygen reduction catalyst of the present invention and the polymer electrolyte membrane can be unified by a known method for use. By applying, to an electrolyte membrane, a material obtained by dispersing the electrochemical oxygen reduction catalyst of the present invention and an electrolyte material, a carbon material, or the like, in water or a solvent; or by transferring a catalyst layer applied to a substrate to an electrolyte membrane, the catalyst layer can be formed on the electrolyte membrane.

Usable examples of the polymer electrolyte membrane include various perfluorocarbon-based, styrene-divinylbenzene copolymer-based, or polybenzimidazole-based ion exchange resin membranes; inorganic polymer ion exchange membranes; organic-inorganic composite polymer ion exchange membranes; etc.

The structure of the fuel electrode is not particularly limited, and the fuel electrode can have the same structure as that of a known polymer electrolyte fuel cell. As the catalyst for fuel electrodes, various conventionally known metals, metal alloys, and metal complexes can be used. Usable metal types include precious metals, such as platinum, palladium, iridium, rhodium, ruthenium, and gold used in conventional polymer electrolyte fuel cells (PEFCs), as well as base metals, such as nickel, silver, cobalt, iron, copper, and zinc. A single metal catalyst or a single metal complex selected from these metals, or an alloy or a metal complex composite composed of two or more metals in any combination, can be used. Further, a composite catalyst of a metal catalyst selected from the above and another metal oxide, and a supported catalyst in which catalyst fine particles are dispersed on a carrier such as a carbonaceous material or metal oxide can also be used.

By sandwiching both sides of the obtained membrane-electrode assembly with current collectors, such as carbon paper or carbon cloth, so that the membrane-electrode assembly is incorporated into a cell, a polymer electrolyte fuel cell can be produced.

On the other hand, when the catalyst is applied to a phosphoric acid fuel cell rather than a polymer electrolyte fuel cell, a phosphoric acid aqueous solution is immersed in various separators as an electrolyte rather than a polymer electrolyte membrane. The other components are the same as those of the polymer electrolyte fuel cell.

When the electrochemical oxygen reduction catalyst of the present invention is used for an air electrode of a metal-air battery, a metal such as zinc, aluminum, magnesium, or iron can be used as the metal anode of the metal-air battery. The specific structure of the metal anode can be the same as that of a known metal-air battery. The other components are the same as those of the polymer electrolyte fuel cell.

In cells having the above structure, oxygen or air can be supplied or spontaneously diffused to the air electrode side in any case. In fuel cells (in particular, polymer electrolyte fuel cells, phosphoric acid fuel cells, etc.), a substance serving as a fuel can be supplied to the fuel electrode side. As the fuel substance, other than hydrogen gas, alcohols such as methanol, ethanol, isopropanol, and ethylene glycol; a solution of formic acid, borohydride, hydrazine, and sugar can be used.

The operating temperature in the case when the cell of the present invention is a fuel cell (particularly a polymer electrolyte fuel cell, phosphoric acid fuel cell, etc.) varies depending on the electrolyte used; however, it is usually about 0 to 250° C., and preferably about 10 to 80° C.

EXAMPLES

The present invention will be described in more detail below with reference to Examples and Comparative Examples. The present invention is not limited to the following examples. As melamine, 1,3,5-triazine, diaminodiethylamino-1,3,5-triazine, and 2,4-diamino-6-butylamino-1,3,5-triazine, commercially available products produced by Tokyo Chemical Industry Co., Ltd. were used; and as 2,4,6-tris (dimethylamino)-1,3,5-triazine, a commercially available product produced by Sigma Aldrich Co., LLC, was used.

Synthetic Example 1: Melamine Resin

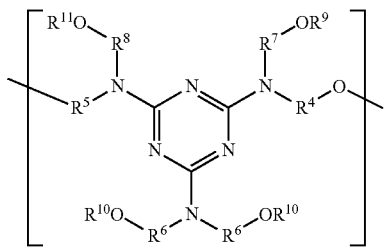

As a melamine resin raw material, a commercially available product (produced by Sigma Aldrich Co., LLC; number average molecular weight: 432) was used. This raw material was diluted to 5 wt % with 1-butanol. The dilution (27 L) was dissolved in a mixed solvent of ultrapure water (5.14 mL) and 2-propanol (1.62 mL) to prepare a melamine resin coating liquid. The melamine resin coating liquid (3.6 NL) was added dropwise to a glassy carbon electrode produced by BAS (surface area: 0.0707 cm²), followed by drying in an oven at 100° C. for 15 minutes to increase the polymerization degree. Thus, the melamine resin coating liquid was fixed to the electrode. The melamine resin thus obtained can be presumed to be a compound in which several monomers are bonded, and has the repeating unit represented by formula (2A).

Synthetic Example 2: Melamine-Containing Polyolefin Resin

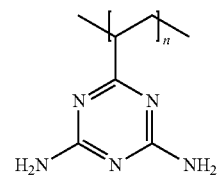

In accordance with a previous report (Macromolecules, 31, 371-377 (1998)), a melamine-containing polyolefin resin (polymerization degree: 120 to 240) was synthesized.

Example 1: Effects of Increase in Oxygen Reduction Activity of Platinum Catalyst by Melamine (Immersion)

A platinum catalyst (5 mg) (produced by Tanaka Kikinzoku Kogyo, TEC10E50E, average particle size: 2 to 3 nm) was suspended in a mixed solvent of ultrapure water (5.14 mL) and 2-propanol (1.62 mL). The suspension (3.6 μL) was added dropwise to a glassy carbon electrode (surface area: 0.0707 cm²) produced by BAS Inc., followed by drying.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte, a 0.1M perchloric acid aqueous solution was used. First, cyclic voltammetry was performed under argon atmosphere, and then a gas atmosphere was changed to oxygen to perform linear sweep voltammetry from the low-potential side. Thus, the oxygen reduction activity obtained when the catalyst free of a melamine compound and a melamine resin was used was evaluated.

Next, the electrode was taken out, and immersed in a melamine aqueous solution (0.7 mM) for 10 minutes so that melamine was adsorbed on the platinum catalyst. Thereafter, the same measurement as before immersion was performed again. By this measurement, the oxygen reduction activity of the catalyst in which melamine is supported on platinum can be evaluated. In this case, the coverage of the melamine calculated from the ECSA was 40%.

FIG. 1 is a linear sweep voltammogram under oxygen atmosphere. By immersing the electrode in the melamine aqueous solution so that melamine was adsorbed (supported) on platinum, the reduction current (−j) in the high-potential region above 0.9 V was increased. This indicated that by immersing the electrode in the melamine aqueous solution so that melamine was adsorbed (supported) on platinum, the oxygen reduction activity was increased and the overvoltage was reduced, thus reducing the amount of platinum used.

17

Example 2: Effects of Increase in Oxygen Reduction Activity and Durability of Platinum Catalyst by Melamine Resin (Drying after Adding Dropwise)

A platinum catalyst (5 mg) (produced by Tanaka Kikinzoku Kogyo, TEC10E50E, average particle size: 2.5 nm) was suspended in a mixed solvent of ultrapure water (5.14 mL) and 2-propanol (1.62 mL). The suspension (3.6 µL) was added dropwise to a glassy carbon electrode (surface area: 0.0707 cm$^2$) produced by BAS Inc., and dried.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte, a 0.1M perchloric acid aqueous solution was used. First, cyclic voltammetry was performed under argon atmosphere, and then a gas atmosphere was changed to oxygen to perform linear sweep voltammetry from the low-potential side. Thus, the oxygen reduction activity obtained when the catalyst free of a melamine compound and a melamine resin was used was evaluated.

Next, a melamine resin raw material (produced by Sigma Aldrich Co., LLC) was diluted to 5 wt % with 1-butanol. The dilution (27 µL) was dissolved in a mixed solvent of ultrapure water (5.14 mL) and 2-propanol (1.62 mL) to prepare a melamine resin coating liquid.

Next, the electrode was taken out, and 3.6 µL of the melamine resin coating liquid was added dropwise to the electrode, followed by drying at 100° C. for 15 minutes, thereby fixing the melamine resin to the platinum catalyst. Thereafter, the same measurement as before coating was performed again. By this measurement, the oxygen reduction activity of the catalyst in which a melamine resin is supported on platinum can be evaluated.

Further, the catalyst in which the melamine resin was adsorbed on the platinum catalyst was subjected to 150 cycles of cyclic voltammetry under argon atmosphere at 0.05 V to 1.0 V, and then the same measurement as before the immersion was performed again. By this measurement, the retention (durability) of the oxygen reduction activity of the catalyst in which a melamine resin is supported on platinum can be evaluated.

Figure 2:
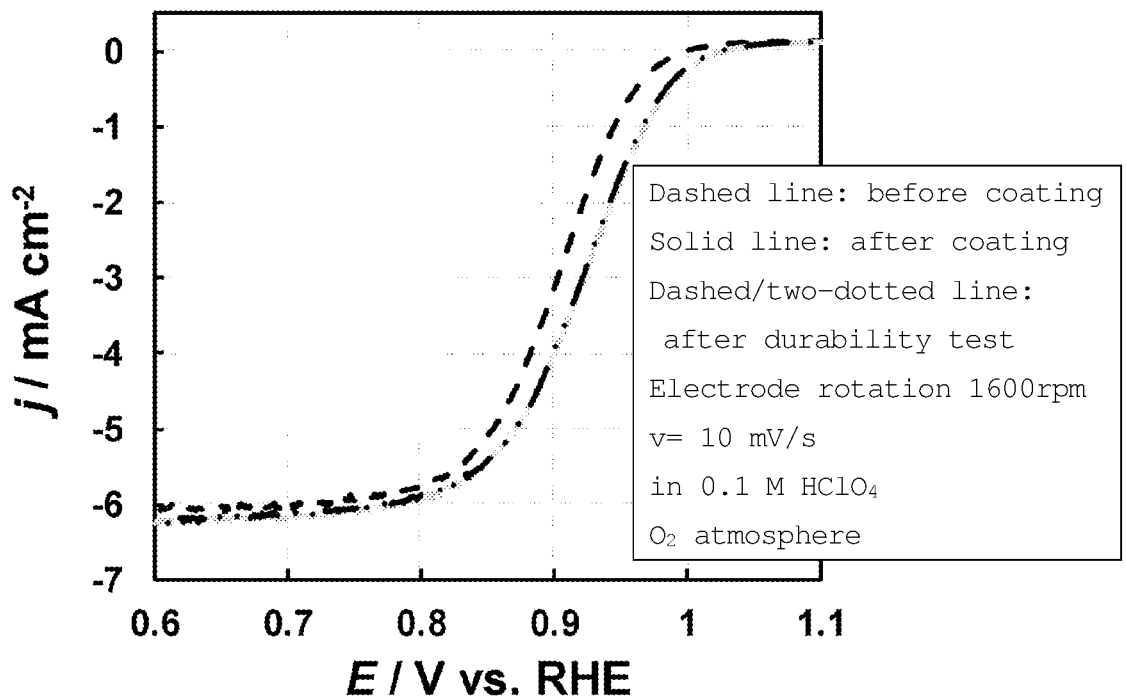
FIG. 2 is a linear sweep voltammogram showing the results of Example 2 (effects of increase in oxygen reduction activity and durability of the oxygen reduction activity by melamine resin adsorption).

FIG. 2 is a linear sweep voltammogram under oxygen atmosphere. By adding a melamine resin coating liquid dropwise so that melamine was adsorbed (supported) on platinum, the reduction current (−j) in the high-potential region above 0.9 V was increased. This indicated that by adding the melamine resin coating liquid dropwise so that the melamine resin was adsorbed (supported) on platinum, the oxygen reduction activity was increased, and the overvoltage was reduced, thus reducing the amount of platinum used. The coverage of the melamine calculated from the ECSA was 46%.

Moreover, even after repeated potential cycling tests, the reduction current (−j) in the high-potential region above 0.9 V was hardly changed. This indicates that the oxygen reduction activity is maintained, and excellent durability is attained even after repeated potential cycling. Additionally, when the same test using the catalyst of Example 1 was performed, the same results as before immersion was obtained, showing the superiority of melamine resin over melamine.

Comparative Example 1: Effects of Increase in Oxygen Reduction Activity of Platinum Catalyst by 1,3,5-Triazine (Immersion)

A catalyst was produced in the same manner as in Example 1, except that an acetone solution (0.7 mM) of 1,3,5-triazine was used in place of the melamine aqueous solution, and evaluated.

Figure 3:
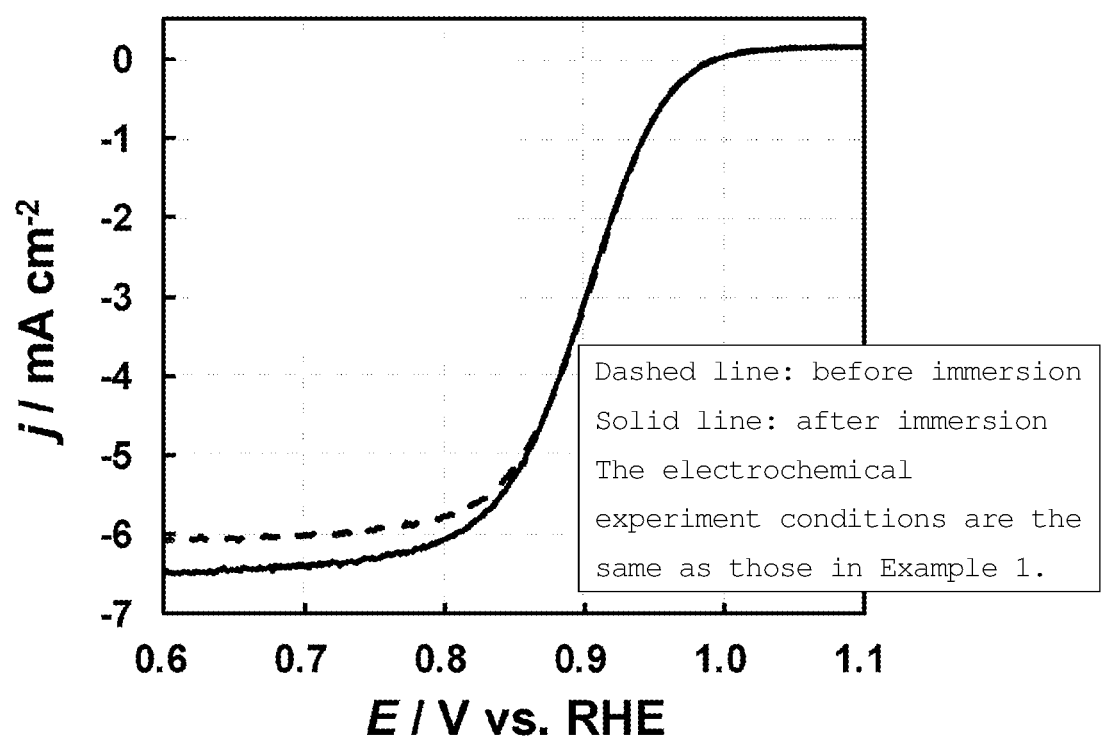
FIG. 3 is a linear sweep voltammogram showing the results of Comparative Example 1 (effects of increase in oxygen reduction activity by 1,3,5-triazine adsorption).

FIG. 3 is a linear sweep voltammogram under oxygen atmosphere. Even when the electrode was immersed in the acetone solution of 1,3,5-triazine so that the 1,3,5-triazine was adsorbed (supported) on platinum, the reduction current (−j) in the high-potential region above 0.9 V was not changed. This indicated that even when the electrode was immersed in the acetone solution of 1,3,5-triazine so that 1,3,5-triazine was adsorbed (supported) on platinum, the oxygen reduction activity was not increased and the overvoltage was not reduced, thus failing to reduce the amount of platinum used. In this case, the coverage of the 1,3,5-triazine calculated from the ECSA was 6%. Additionally, even when the same test was performed by increasing the concentration of 1,3,5-triazine to 3 mM, the reduction current (−j) in the high-potential region above 0.9 V was not changed, the oxygen reduction activity was not increased, and the overvoltage was not reduced, thus failing to reduce the amount of platinum used.

Example 3: Effects of Increase in Oxygen Reduction Activity of Platinum Catalyst by Diaminodiethylamino-1,3,5-Triazine (Immersion)

A catalyst was produced in the same manner as in Example 1, except that an acetone solution (3 mM) of diaminodiethylamino-1,3,5-triazine was used in place of the melamine aqueous solution, and evaluated.

Figure 4:
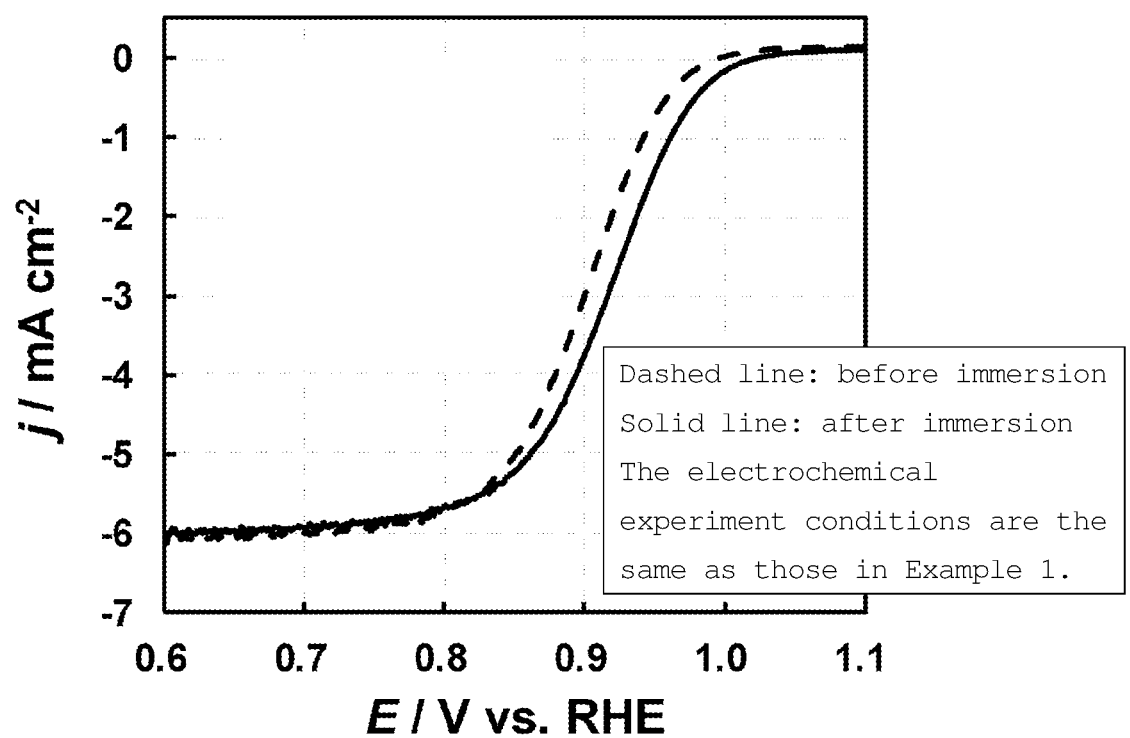
FIG. 4 is a linear sweep voltammogram showing the results of Example 3 (effects of increase in oxygen reduction activity by diaminodiethylamino-1,3,5-triazine adsorption).

FIG. 4 is a linear sweep voltammogram under oxygen atmosphere. By immersing the electrode in the acetone solution of diaminodiethylamino-1,3,5-triazine so that diaminodiethylamino-1,3,5-triazine was adsorbed (supported) on platinum, the reduction current (−j) in the high-potential region above 0.9 V was increased. This indicated that by immersing the electrode in the acetone solution of diaminodiethylamino-1,3,5-triazine so that diaminodiethylamino-1,3,5-triazine was adsorbed (supported) on platinum, the oxygen reduction activity was increased and the overvoltage was reduced, thus reducing the amount of platinum used. The coverage of the diaminodiethylamino-1,3,5-triazine calculated from the ECSA was 37%.

Comparative Example 2: Effects of Increase in Oxygen Reduction Activity of Platinum Catalyst by Melamine-Containing Polyolefin Resin (Poly(2-vinyl-4,6-diamino-1,3,5-triazine) (Immersion)

A catalyst was produced in the same manner as in Example 1, except that a pyridine suspension (0.7 mM) of the melamine-containing polyolefin resin (poly(2-vinyl-4,6-diamidino-1,3,5-triazine) obtained in Synthetic Example 2 was used in place of the melamine aqueous solution, and evaluated.

Figure 5:
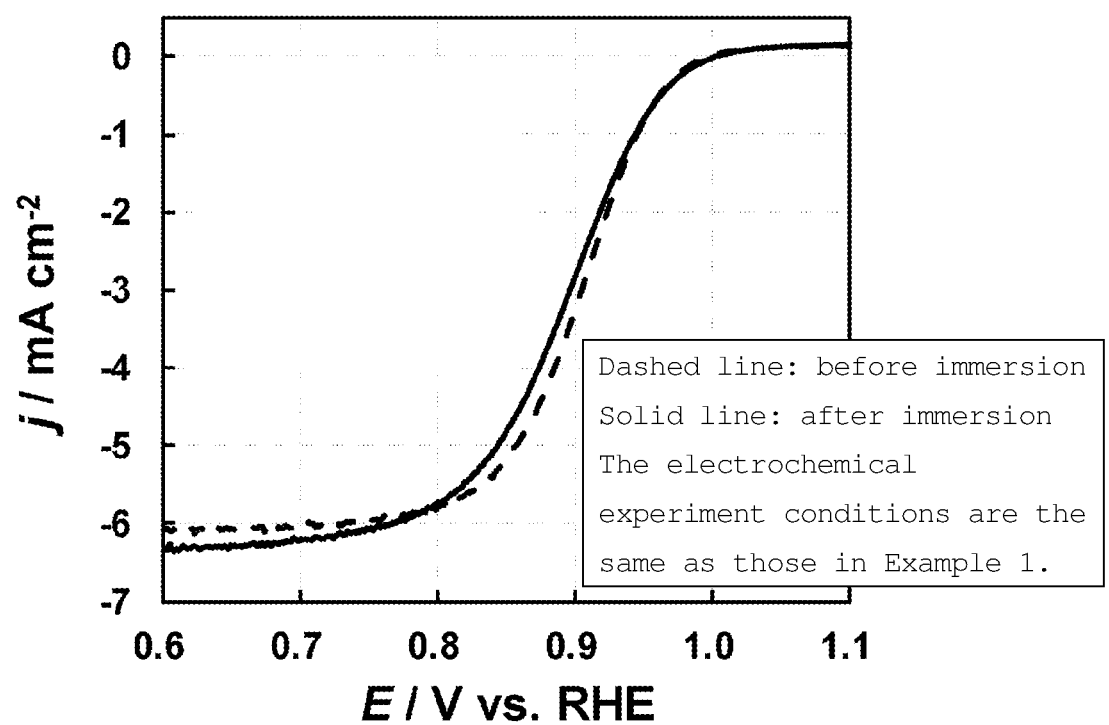
FIG. 5 is a linear sweep voltammogram showing the results of Comparative Example 2 (effects of increase in oxygen reduction activity by melamine-containing polyolefin resin adsorption).

FIG. 5 is a linear sweep voltammogram under oxygen atmosphere. Even when the electrode was immersed in the pyridine solution of the melamine-containing polyolefin resin so that the melamine-containing polyolefin resin was adsorbed (supported) on platinum, the reduction current (−j) in the high-potential region above 0.9 V was not changed. This indicated that even when the electrode was immersed in the pyridine solution of the melamine-containing polyolefin resin so that melamine-containing polyolefin resin was adsorbed (supported) on platinum, the oxygen reduction activity was not increased and the overvoltage was not reduced, thus failing to reduce the amount of platinum used. The coverage of the melamine-containing polyolefin resin calculated from the ECSA was 62%.

Example 4: Effects of Increase in Oxygen Reduction Activity of Platinum Catalyst by Thiocyanuric Acid (Immersion)

A catalyst was produced in the same manner as in Example 1, except that an acetone solution (3 mM) of thiocyanuric acid was used in place of the melamine aqueous solution, and evaluated.

Figure 6:
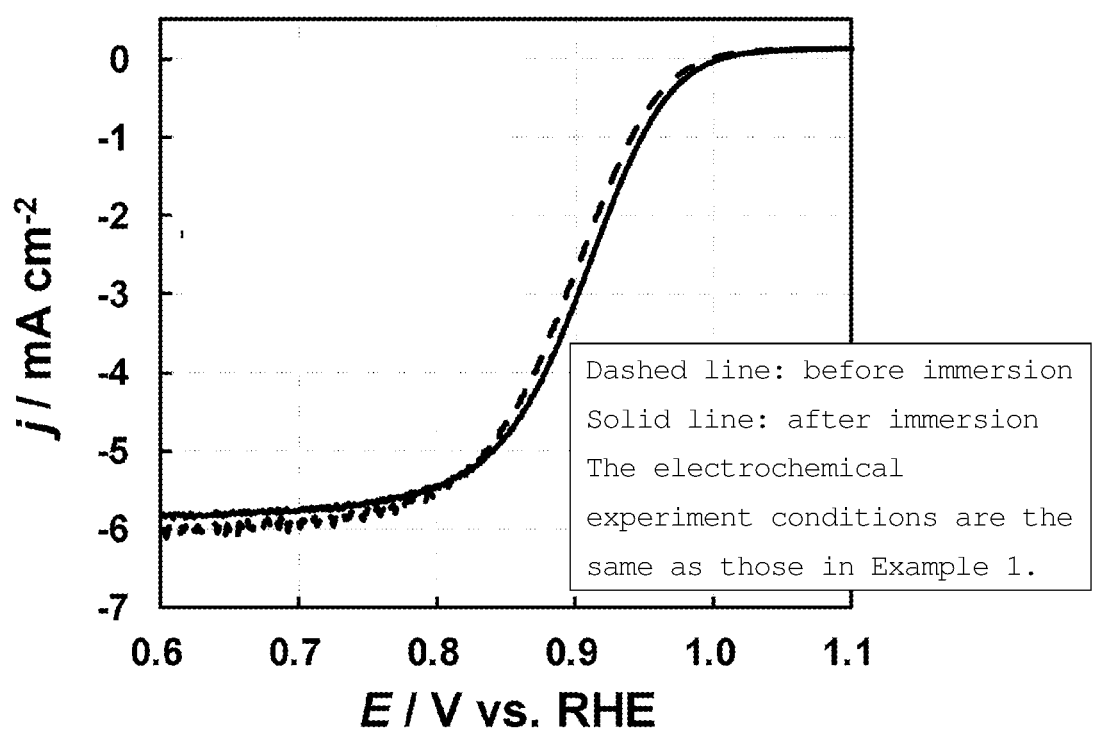
FIG. 6 is a linear sweep voltammogram showing the results of Example 4 (effects of increase in oxygen reduction activity by thiocyanuric acid adsorption).

FIG. 6 is a linear sweep voltammogram under oxygen atmosphere. By immersing the electrode in the acetone solution of thiocyanuric acid so that thiocyanuric acid was adsorbed (supported) on platinum, the reduction current (−j) in the high-potential region above 0.9 V was increased. This indicated that by immersing the electrode in the acetone solution of thiocyanuric acid so that thiocyanuric acid was adsorbed (supported) on platinum, the oxygen reduction activity was increased and the overvoltage was reduced, thus reducing the amount of platinum used. In this case, the coverage of the thiocyanuric acid calculated from the ECSA was 34%.

Example 5: Effects of Increase in Oxygen Reduction Activity of Platinum Catalyst by 2,4-Diamino-6-butylamino-1,3,5-triazine (Immersion)

A catalyst was produced in the same manner as in Example 1, except that an acetone solution (0.7 mM) of 2,4-diamino-6-butylamino-1,3,5-triazine was used in place of the melamine aqueous solution, and evaluated.

Figure 7:
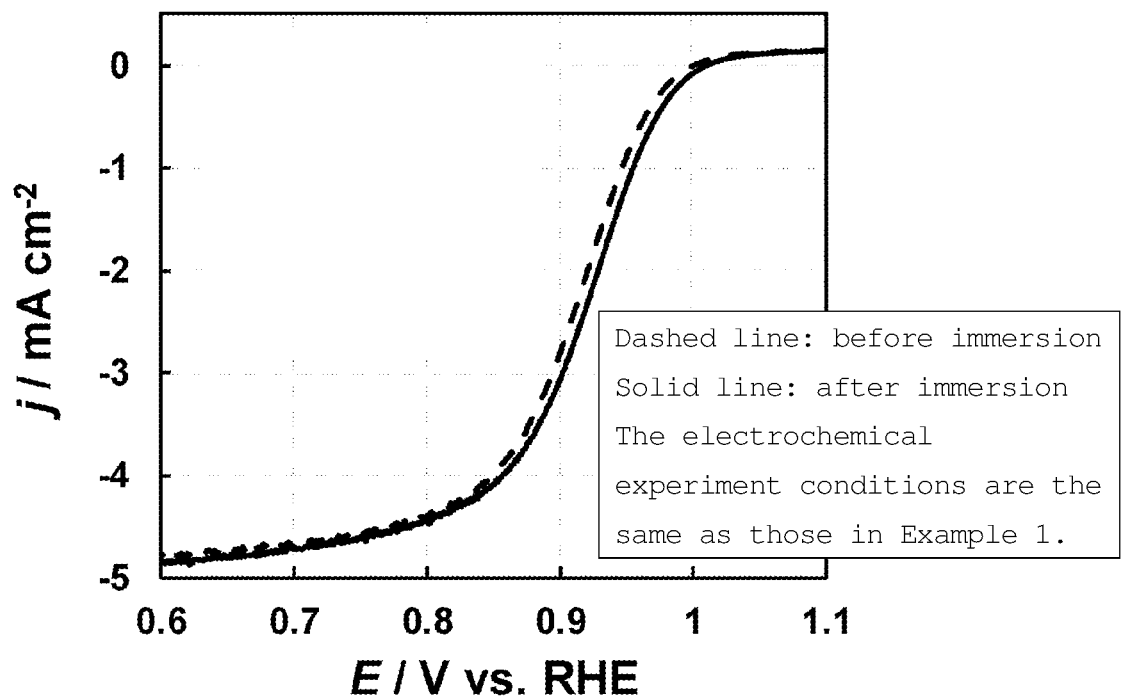
FIG. 7 is a linear sweep voltammogram showing the results of Example 5 (effects of increase in oxygen reduction activity by 2,4-diamino-6-butylamino-1,3,5-triazine adsorption).

FIG. 7 is a linear sweep voltammogram under oxygen atmosphere. By immersing the electrode in the acetone solution of 2,4-diamino-6-butylamino-1,3,5-triazine so that 2,4-diamino-6-butylamino-1,3,5-triazine was adsorbed (supported) on platinum, the reduction current (−j) in the high-potential region above 0.9 V was increased. This indicated that by immersing the electrode in the acetone solution of 2,4-diamino-6-butylamino-1,3,5-triazine so that 2,4-diamino-6-butylamino-1,3,5-triazine was adsorbed (supported) on platinum, the oxygen reduction activity was increased and the overvoltage was reduced, thus reducing the amount of platinum used. The coverage of the 2,4-diamidino-6-butylamino-1,3,5-triazine calculated from the ECSA was 28%.

Example 6: Effects of Increase in Oxygen Reduction Activity of Platinum Catalyst by 2,4,6-Tris(dimethylamino)-1,3,5-trizaine (Immersion)

A catalyst was produced in the same manner as in Example 1, except that an acetone solution of 2,4,6-tris(dimethylamino)-1,3,5-trizaine (0.7 mM) was used in place of the melamine aqueous solution, and evaluated.

Figure 8:
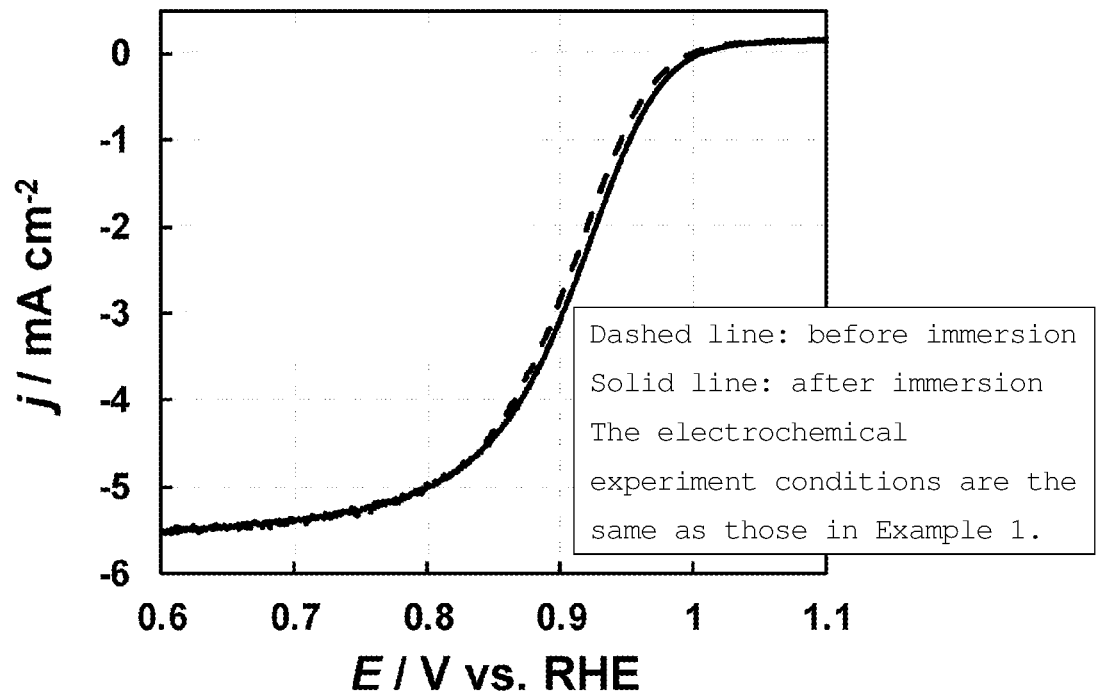
FIG. 8 is a linear sweep voltammogram showing the results of Example 6 (effects of increase in oxygen reduction activity by 2,4,6-tris(dimethylamino)-1,3,5-triazine adsorption).

FIG. 8 is a linear sweep voltammogram under oxygen atmosphere. By immersing the electrode in the acetone solution of 2,4,6-tris(dimethylamino)-1,3,5-trizaine so that 2,4,6-tris(dimethylamino)-1,3,5-trizaine was adsorbed (supported) on platinum, the reduction current (−j) in the high-potential region above 0.9 V was increased. This indicated that by immersing the electrode in the acetone solution of 2,4,6-tris(dimethylamino)-1,3,5-trizaine so that 2,4,6-tris(dimethylamino)-1,3,5-trizaine was adsorbed (supported) on platinum, the oxygen reduction activity was increased and the overvoltage was reduced, thus reducing the amount of platinum used. The coverage of the 2,4,6-tris(dimethylamino)-1,3,5-triazine calculated from the ECSA was 23%.

INDUSTRIAL APPLICABILITY

The electrochemical oxygen reduction catalyst of the present invention can be used for an air electrode (cathode) of fuel cells, metal-air batteries, etc.

The invention claimed is:

1. An electrochemical oxygen reduction catalyst comprising platinum-containing nanoparticles and a polymer containing a melamine compound or a thiocyanuric acid compound as a monomer,
wherein the polymer containing the melamine compound or the thiocyanuric acid compound as a monomer is a polymer containing a repeating unit represented by formula (2):

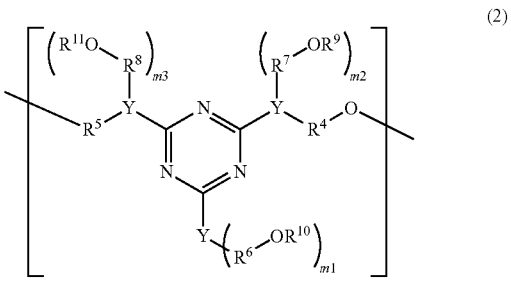

wherein
Ys may be the same or different, and represent nitrogen or sulfur;
$R^4$ to $R^8$ may be the same or different, and represent a divalent group;
$R^9$ to $R^{11}$ may be the same or different, and represent hydrogen, substituted or unsubstituted alkyl, substituted or unsubstituted alkenyl, or substituted or unsubstituted aryl;
m1 is 1 or 2, with the proviso that when Y to which $R^6$ is bonded is sulfur, m1 is 1; and when m1 is 2, two $R^6$s may be the same or different and two $R^{10}$s may be the same or different;
m2 and m3 may be the same or different, and represent 0 or 1, with the proviso that Y to which $R^7$ or $R^8$ is bonded is sulfur, m2 and m3 are 0; and
$OR^9$ to $OR^{11}$ may be partially or fully eliminated, and cross-linked to the divalent group represented by $R^4$ to $R^8$ to form a three-dimensional mesh structure.

2. The electrochemical oxygen reduction catalyst according to claim 1, wherein the polymer containing the melamine compound or the thiocyanuric acid compound as a monomer is supported on the platinum-containing nanoparticles.

3. The electrochemical oxygen reduction catalyst according to claim 1, wherein in formula (2), each of $R^4$ to $R^8$ is substituted or unsubstituted alkylene, substituted or unsubstituted alkenylene, or substituted or unsubstituted arylene.

4. The electrochemical oxygen reduction catalyst according to claim 1, which is supported on a conductive carrier.

5. The electrochemical oxygen reduction catalyst according to claim 4, wherein the conductive carrier is a carbonaceous material.

6. The electrochemical oxygen reduction catalyst according to claim 1, which is a cathode catalyst for fuel cells.

7. An air electrode for fuel cells or metal-air batteries, using the electrochemical oxygen reduction catalyst according to claim 1.

8. A fuel cell using the air electrode according to claim 7 as a cathode.

9. A metal-air battery using the air electrode according to claim 7 as a cathode.

* * * * *